E. Reynolds.
Churn.
Nº 94,646.                               Patented Sep. 7, 1869.
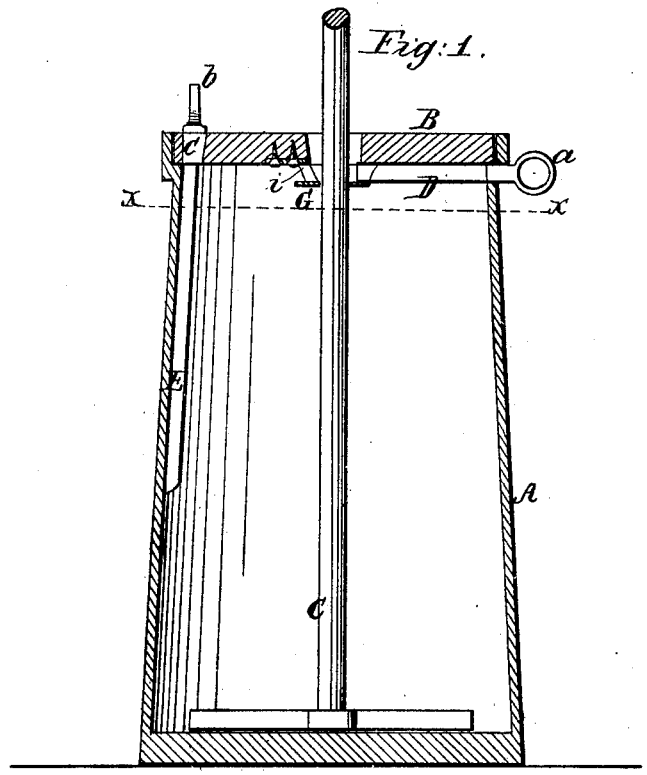
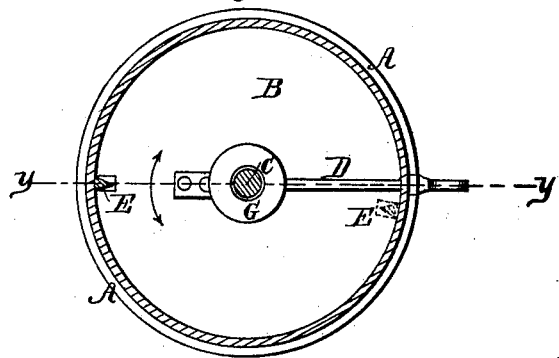
Witnesses;
L. Hailer
Phil T. Dodge
Inventor;
E. Reynolds
by Dodge & Munn
his atty.

United States Patent Office.

EDWARD REYNOLDS, OF OMRO, WISCONSIN.

Letters Patent No. 94,646, dated September 7, 1869.

IMPROVEMENT IN CHURNS.

The Schedule referred to in these Letters Patent and making part of the same.

*To all whom it may concern:*

Be it known that I, EDWARD REYNOLDS, of Omro, in the county of Winnebago, and State of Wisconsin, have invented certain new and useful Improvements in Scrapers for Dasher-Churns; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to dasher-churns; and

It consists in certain improvements upon the churn-lid screens for which Letters Patent were granted to me, bearing date the 13th day of April, 1869, and numbered 88,983.

In the drawings—

Figure 1 is a vertical section through the centre of a churn having my improvements applied, and Figure 2 is a transverse section of the same, taken on the line *x x* of fig. 1, looking from below.

During the operation of churning in churns as ordinarily constructed, considerable quantities of cream and butter accumulate on the inner walls, adhering both to the sides and to the under portion of the lid, sometimes to the thickness of an inch or more, and also particles of the same adhering to the dasher-handle are carried up through and deposited on top of the lid. This is found to be a great source of annoyance to butter-makers, for the reason that if not returned to the mass in the churn this adhering portion will be of a different color from the rest, and also that that accumulating on top becomes filled with dust, dirt, &c. Consequently the operation of churning has to be frequently suspended, the lid removed, and the adhering mass cleaned off, causing a considerable delay, and being a greasy, disagreeable operation.

My improvement consists in certain devices by which the interior may be cleaned without removing the lid or stopping the churning, and for scraping off the dasher-handle at each stroke, and thus preventing any accumulation on top of the lid also.

In applying my devices, I take an ordinary churn, A, and through one side I make a small hole, opening immediately under the edge of the lid B.

Through this hole I insert a blade or scraper, D, of sufficient length to reach nearly to the dasher-handle C, and with its upper edge in close contact with the under side of the lid, as shown clearly in figs. 1 and 2.

The outer end of this blade I slightly enlarge, so that when inserted it shall fit snugly, and also form on its outer end a ring or handle, *a*, forming a ready means by which to hold or withdraw it.

Through the lid B, which is made to turn loosely in its seat, I insert a vertical blade or scraper, E, lying against the inside wall of the churn, and extending half way, or thereabouts, to the bottom. This scraper is also fitted tightly to its seat, and provided, on its projecting end, with a ring or handle.

Inside of the churn, around the dasher-handle, I place a disk or plate, G, secured to the lid by means of an upwardly-projecting arm, *i*, and the top of which comes in line with the under edge of blade D, as shown in fig. 1.

When the devices are arranged as described, and the churn set in operation, the plate G scrapes off all adhering substances from the dasher-handle, allowing none to pass above it, the particles dropping back into the mass below as fast as they are removed from the handle, the same as in my previous patent.

As the churning progresses, and the cream or butter begins to accumulate on the walls, and requires to be scraped down, the lid is turned so as to bring the blade E around against the blade D, as shown in dotted lines. The lid is then turned nearly a revolution, or until the blade E is brought around against the opposite side of blade D.

During this revolution of the lid, the blade E, being carried with it, scrapes or cleans off the body, while the blade D, remaining stationary, cleans off the lid.

By this arrangement of scrapers I produce a simple device for keeping the interior of the churn and the dasher-handle clean, without opening the churn or ceasing operation.

It will be observed that by suspending the ring G by a single arm, *i*, the end of the scraper D can enter between it and the lid, the ring thus supporting the inner end of the scraper, and that the lid can be turned almost entirely around without drawing the scraper, which could not be done if the ring G was supported by several arms, as in my former patent.

It is also obvious that either scraper may be used independent of the others, if desired.

Having thus described my invention,

What I claim, is—

1. The scraper D, arranged to operate in connection with a churn, substantially as described.

2. The combination of the scraper D and ring G, attached to the lid by an arm, *i*, constructed and arranged substantially as and for the purpose set forth.

3. The scraper E, when constructed and arranged to operate in connection with a churn, substantially as herein described.

EDWARD REYNOLDS.

Witnesses:
N. FRANK,
D. E. PINGREY.